US012559156B2

(12) United States Patent
Sheldrick

(10) Patent No.: US 12,559,156 B2
(45) Date of Patent: Feb. 24, 2026

(54) CANOPY DEVICE AND CHILD CARRIER HAVING THE SAME

(71) Applicant: WONDERLAND SWITZERLAND AG, Steinhausen (CH)

(72) Inventor: Jennifer E. Sheldrick, Malvern, PA (US)

(73) Assignee: Wonderland Switzerland AG, Steinhausen (CH)

( * ) Notice: Subject to any disclaimer, the term of this patent is extended or adjusted under 35 U.S.C. 154(b) by 307 days.

(21) Appl. No.: 18/263,058

(22) PCT Filed: Jan. 27, 2022

(86) PCT No.: PCT/EP2022/051926
§ 371 (c)(1),
(2) Date: Jul. 26, 2023

(87) PCT Pub. No.: WO2022/162077
PCT Pub. Date: Aug. 4, 2022

(65) Prior Publication Data
US 2024/0124044 A1 Apr. 18, 2024

(30) Foreign Application Priority Data

Jan. 27, 2021 (CN) .......................... 202120233004.X

(51) Int. Cl.
*B62B 9/12* (2006.01)
*B62B 9/14* (2006.01)

(52) U.S. Cl.
CPC .................................... *B62B 9/142* (2013.01)

(58) Field of Classification Search
CPC ....... B62B 2204/00; B62B 9/14; B62B 9/142; B62B 2202/42; B62B 2206/02;
(Continued)

(56) References Cited

U.S. PATENT DOCUMENTS 11,647,732 B2 * 5/2023 Xiang .................. A01K 1/0254
119/496
2007/0257526 A1 * 11/2007 Hei ........................ A47D 13/02
297/184.13
(Continued)

FOREIGN PATENT DOCUMENTS

CN 1980585 A 6/2007
CN 102396924 B 10/2013
(Continued)

OTHER PUBLICATIONS

International Search Report and Written Opinion for Application No. PCT/EP2022/051926 dated Apr. 13, 2022.
(Continued)

*Primary Examiner* — James A Shriver, II
*Assistant Examiner* — Hilary L Johns
(74) *Attorney, Agent, or Firm* — Volpe Koenig

(57) ABSTRACT

The present disclosure relates to a canopy device (1) and a child carrier having the canopy device (1). The canopy device (1) includes: a shielding portion (13); an accommodating portion (18) disposed on a surface of the shielding portion (13) and forming a pocket shape with an opening; and another shielding portion (19) connected to the shielding portion (13) and received in the accommodating portion (18).

15 Claims, 5 Drawing Sheets

(58) Field of Classification Search
CPC B62B 7/062; B62B 7/064; B62B 9/12; B62B 9/203; B62B 9/26; B62B 2501/065; A01K 1/0254
USPC ........................................................ 280/47.38
See application file for complete search history.

(56) References Cited

U.S. PATENT DOCUMENTS

| 2012/0062001 A1* | 3/2012 | Krasley ................... B62B 9/142 |
| | | 297/184.13 |
| 2021/0022314 A1* | 1/2021 | Xiang ....................... B62B 9/26 |
| 2022/0089209 A1* | 3/2022 | Steward .................. B62B 9/142 |

FOREIGN PATENT DOCUMENTS

| CN | 103373385 A | 10/2013 |
| EP | 1598256 A1 | 11/2005 |
| TW | M456953 U | 7/2013 |

OTHER PUBLICATIONS

Office Action issued in corresponding Taiwanese Application No. 112144077 dated Mar. 29, 2024.

* cited by examiner

CANOPY DEVICE AND CHILD CARRIER HAVING THE SAME

CROSS-REFERENCE TO RELATED APPLICATIONS

This application is a 371 National Stage of International Patent Application No. PCT/EP2022/051926, filed on Jan. 27, 2022, which claims the benefit of Chinese Patent Application No. 202120233004.X, filed Jan. 27, 2021, the entire content of which are incorporated herein by reference.

TECHNICAL FIELD

The present disclosure relates to a canopy device, and more particularly, to a canopy device for a child carrier.

BACKGROUND

With the continuous development of economy and society, there is an increasing attention on the health and comfort of children, and a variety of child carriers have been developed in order to take better care of the children such as child beds, baby sleeping baskets, strollers and the like. Most of the existing child carriers are equipped with a canopy. The canopy may be used to protect against the wind, rain and light, so as to better protect the children (especially babies and infants) from wind, rain and light stimulation, and may better ensure sleep of the children. Also, in order to protect the children from being bitten by mosquitoes, the existing canopies are often equipped with mosquito nets for preventing mosquito bites.

However, the existing canopy is not provided with a storage device which is easily operated, so that when the net is not needed, the unfolded net cannot be stored or can only be stored in a complicated way, and may also trip children or caregivers, thereby causing inconvenience for the caregivers to operate and also causing safety hazards for the children. In some other child carriers, a storage space is provided on the canopy, however, the user needs to carry out complicated operations such as pushing, folding and restoring, and the storage space and the net inside are conspicuous after the final storage is completed, thereby destroying the aesthetic design of the appearance of the child carrier.

Therefore, there is a need for such a canopy device that can quickly and simply store a net or other similar coverings. The stored net or other similar coverings may be hidden, so that the coverings of the child carrier may have an aesthetic appearance even in the stored state.

SUMMARY

An objective of the present disclosure is to provide a canopy device which can quickly and simply store a net or other similar coverings, thereby solving at least one of the above-mentioned problems existing in the prior art.

Another objective of the present disclosure is to provide a canopy device, which can hide the stored net or other similar coverings, thereby having an aesthetic appearance and at least solving one of the above-mentioned problems existing in the prior art.

Therefore, an embodiment of the present disclosure provides a canopy device. The canopy device includes: a first shielding portion; an accommodating portion disposed on a surface of the first shielding portion and forming a pocket shape with an opening; and a second shielding portion connected to the first shielding portion and received in the accommodating portion.

Preferably, the accommodating portion includes a closing element at an opening thereof for closing the opening of the accommodating portion, and the second shielding portion is connected to an inner side of the opening of the accommodating portion.

Preferably, the closing element is a zipper, an adhesive tape or a button connecting structure.

Preferably, the second shielding portion includes a first fixing element capable of fixing the second shielding portion to an external application part of the canopy device.

Preferably, the first fixing element is an elastic belt which is sleeved on the external application part.

Preferably, the second shielding portion includes a second fixing element for fixing the second shielding portion to a side of the canopy device.

Preferably, the second fixing element is a part of an adhesive tape or a button connecting structure, and is matched and fixed with corresponding parts at both side parts of the canopy device.

Preferably, the canopy device further includes a third shielding portion and a fourth shielding portion, and the first shielding portion is connected between the third shielding portion and the fourth shielding portion.

Preferably, the canopy device further includes a folding element including a first folding element and a second folding element, the first folding element is disposed on a boundary line between the third shielding portion and the first shielding portion, and the second folding element is disposed on a boundary line between the fourth shielding portion and the first shielding portion, and the first folding element and the second folding element cooperate with each other to fold and hidden the first shielding portion from outside.

Preferably, the folding element is a zipper, an adhesive tape or a button connecting structure.

Preferably, the third shielding portion includes a first shielding portion body and a connecting portion, the first shielding portion body is connected with the first shielding portion, and the connecting portion is configured to fix a side of the first shielding portion body away from the first shielding portion to an external application part of the canopy device.

Preferably, the fourth shielding portion includes a second shielding portion body and an edge portion, the second shielding portion body is connected with the first shielding portion, and the edge portion is arranged at a side of the second shielding portion body away from the first shielding portion.

Preferably, central parts of the third shielding portion, the fourth shielding portion and the first shielding portion are sun-shading clothes and/or waterproof clothes, and two side parts of each of the third shielding portion, the fourth shielding portion and the first shielding portion are mesh yarns.

Preferably, the second shielding portion is a net.

An embodiment of the present disclosure also provides a child carrier including the canopy device as described above; and an external application part. The canopy device is connected to the external application part.

Preferably, the child carrier is a child bed, a stroller or a baby basket.

The canopy device of the present disclosure has the following beneficial technical effects: the canopy device can quickly and easily receive the net or other similar coverings, with simple operation and convenient use, and can hide the received net or other similar coverings, so that the appearance outline of the canopy device is smooth, simple and beautiful.

BRIEF DESCRIPTION OF THE DRAWINGS

Various objectives, features and advantages of the present disclosure will become more apparent by considering the following detailed description of the preferred embodiments of the present disclosure in conjunction with the accompanying drawings. The drawings are only exemplary illustrations of the present disclosure and are not necessarily drawn to scale. In the drawings, the same reference numbers always refer to the same or similar components, in which.

Figure 1:
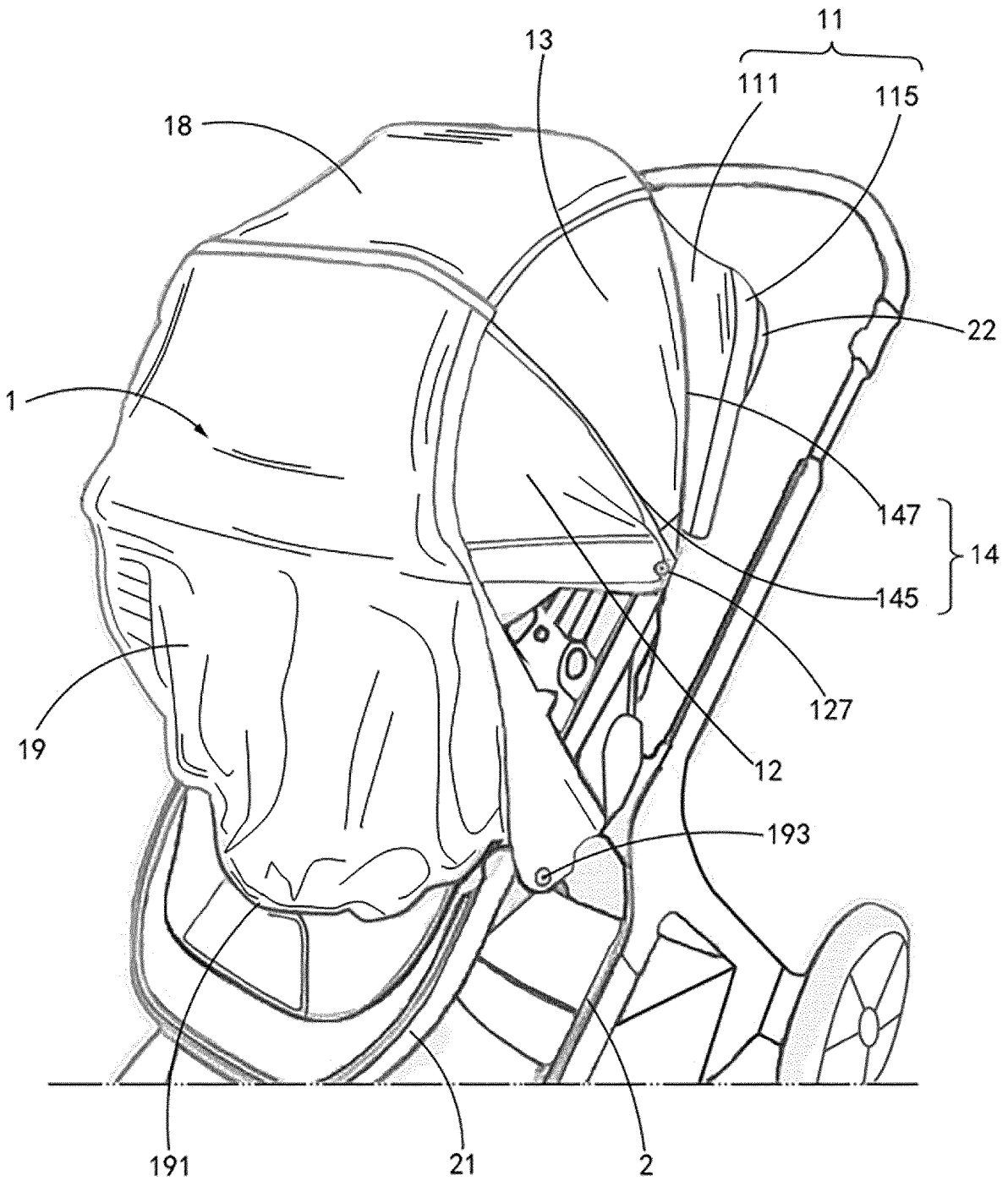
FIG. 1 shows a perspective view of a canopy device and a frame on which the canopy device is installed according to an embodiment of the present disclosure, wherein a fourth shielding portion of the canopy device is in an unfolded (i.e., expanded) state.

LIST OF REFERENCE NUMBERS 1 canopy device
11 first shielding portion
111 first shielding portion body
115 connecting portion
12 second shielding portion
121 second shielding portion body
125 edge portion
127 fixing element
13 third shielding portion
14 folding element
145 first folding element
147 second folding element
18 accommodating portion
181 closing element
19 fourth shielding portion
191 first fixing element
193 second fixing element
2 frame
21 pedal lever
22 backrest lever

DETAILED DESCRIPTION

Hereinafter, exemplary embodiments of the present disclosure will be described in detail with reference to the accompanying drawings. Although the present disclosure is susceptible to various modifications and alternative forms, specific embodiments thereof are shown by way of example in the accompanying drawings. However, the present disclosure should not be construed as being limited to the embodiments set forth herein, and on the contrary, it will cover all modifications, equivalents and alternatives falling within the spirit and scope of the present disclosure.

The present disclosure will be described in detail below with reference to the accompanying drawings.

Figure 2:
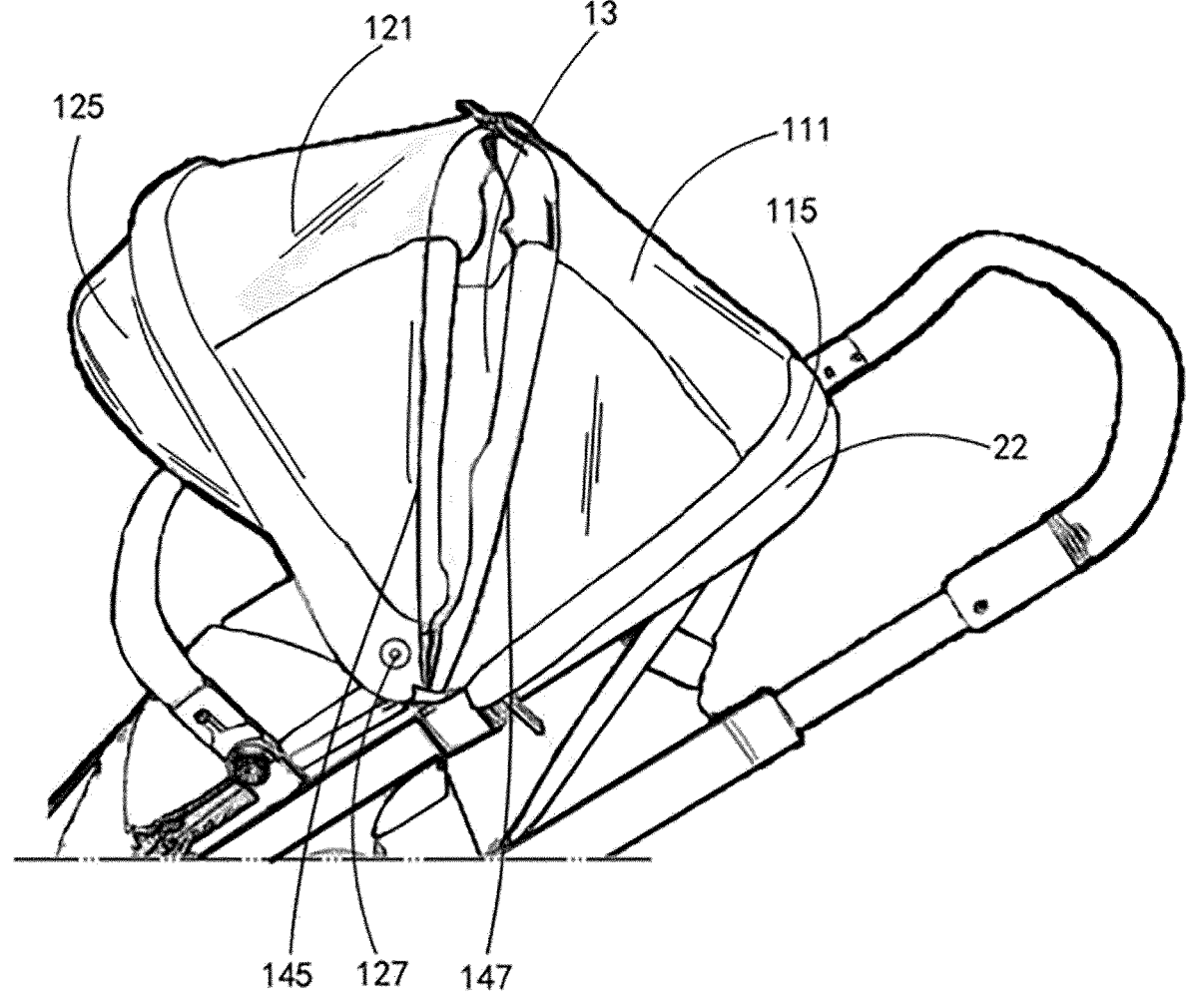
FIG. 2 shows a perspective view of the canopy device and the frame on which the canopy device is installed according to an embodiment of the present disclosure, wherein a third shielding portion of the canopy device is being folded.
Figure 3:
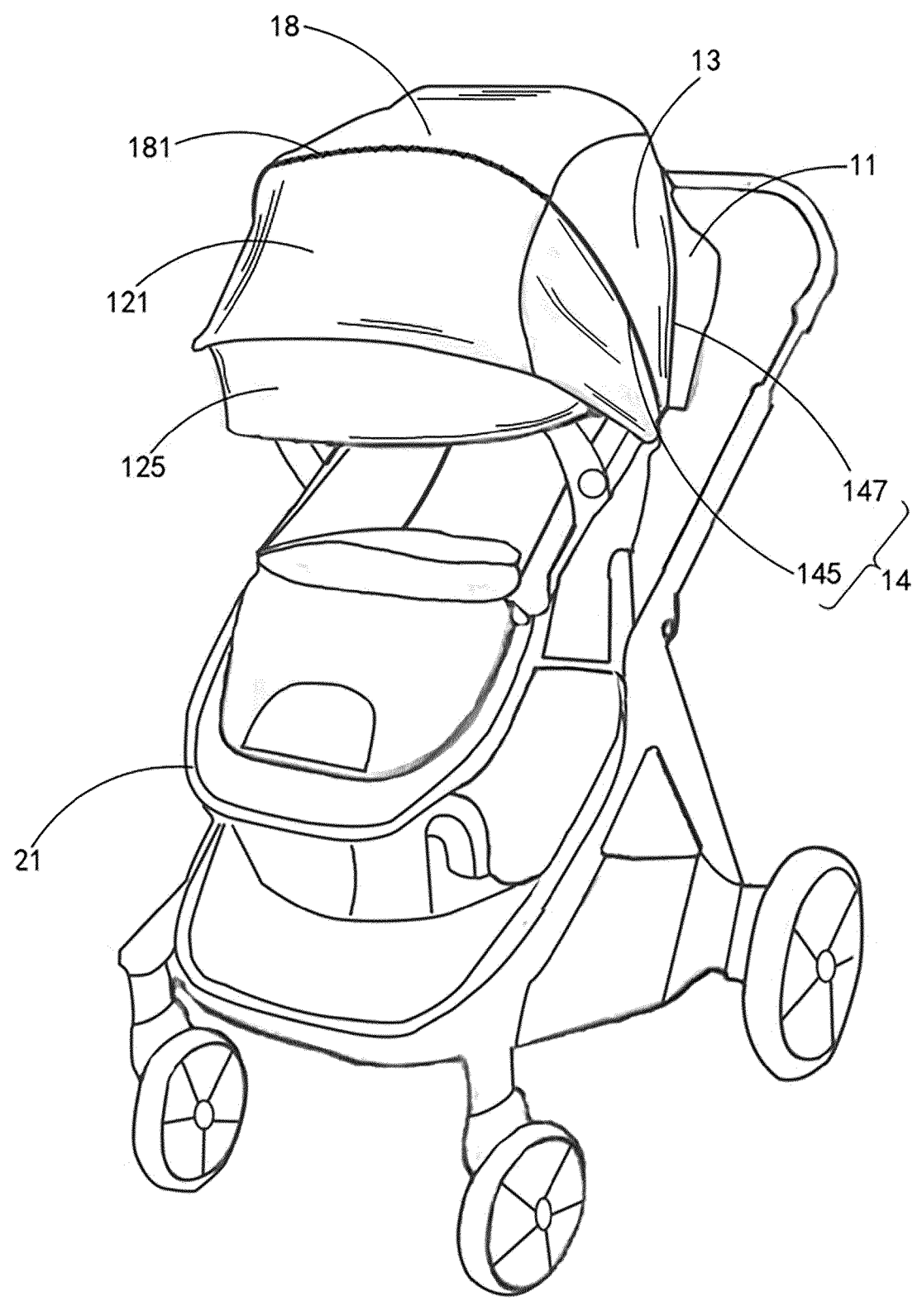
FIG. 3 shows a perspective view of the canopy device and the frame on which the canopy device is installed according to an embodiment of the present disclosure, wherein the canopy device is in a first use state.
Figure 4:
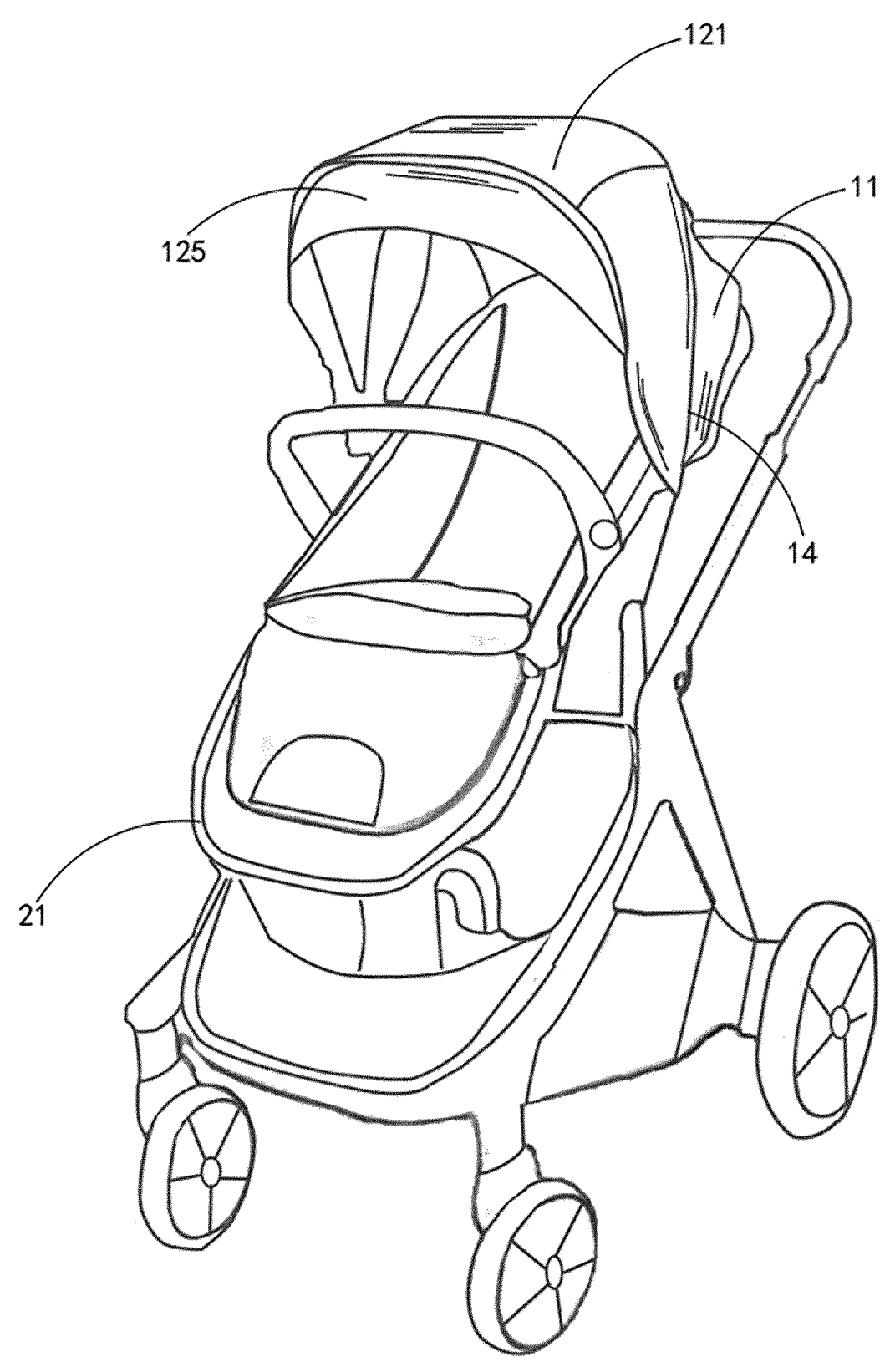
FIG. 4 shows a perspective view of the canopy device and the frame on which the canopy device is installed according to an embodiment of the present disclosure, wherein the canopy device is in a second use state.
Figure 5:
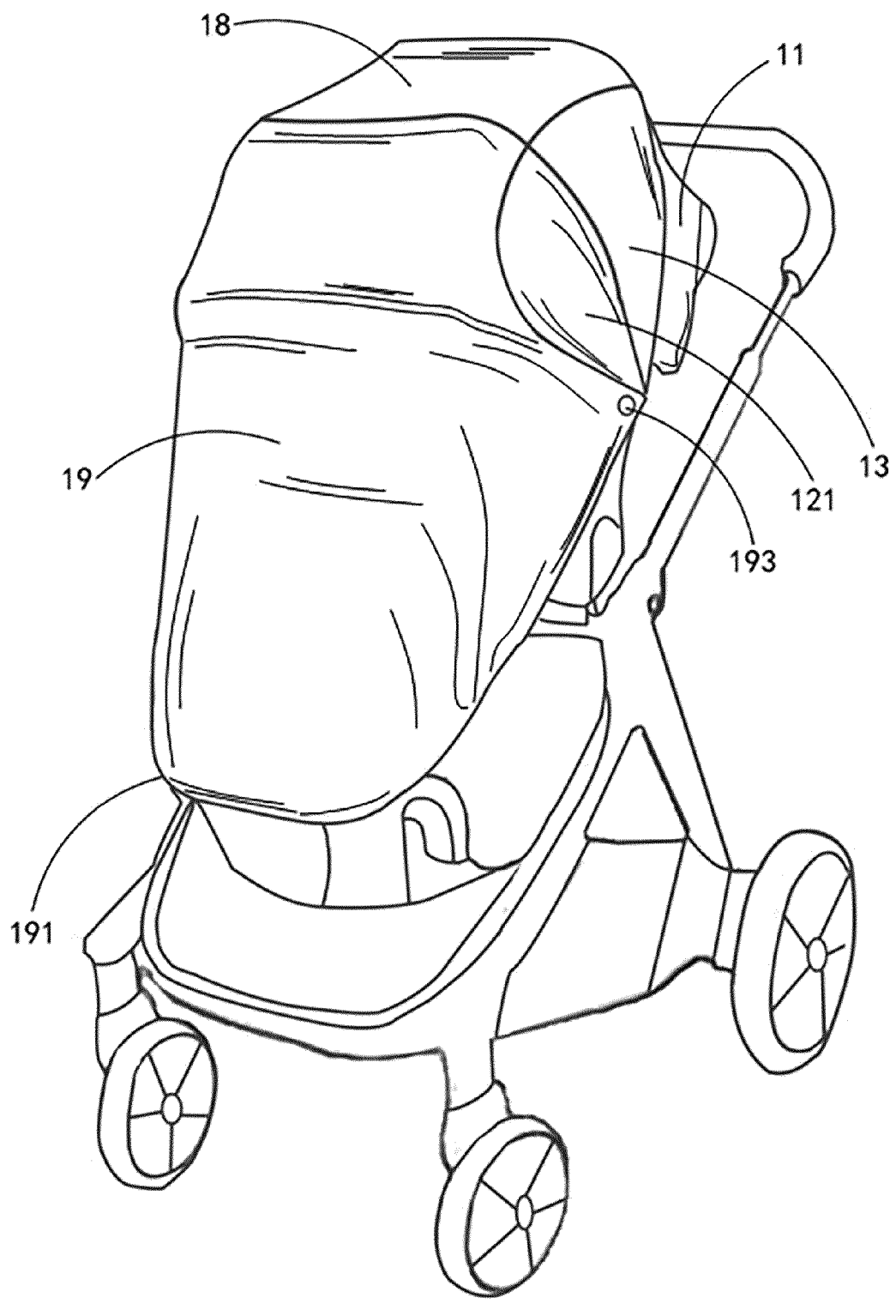
FIG. 5 shows a perspective view of the canopy device and the frame on which the canopy device is installed according to an embodiment of the present disclosure, wherein the canopy device is in a third use state.

FIG. 1 shows a perspective view of a canopy device 1 and a frame 2 on which the canopy device is installed according to an embodiment of the present disclosure, in which a fourth shielding portion 19 of the canopy device 1 is in an unfolded state. FIG. 2 shows a perspective view of the canopy device 1 and the frame 2 on which the canopy device is installed according to an embodiment of the present disclosure, wherein a third shielding portion 13 of the canopy device 1 is being folded. FIG. 3 shows a perspective view of the canopy device 1 and the frame 2 on which the canopy device 1 is installed according to an embodiment of the present disclosure, wherein the canopy device 1 is in a first use state. FIG. 4 shows a perspective view of the canopy device 1 and the frame 2 on which the canopy device 1 is installed according to an embodiment of the present disclosure, wherein the canopy device 1 is in a second use state. FIG. 5 shows a perspective view of the canopy device 1 and the frame 2 on which the canopy device 1 is installed according to an embodiment of the present disclosure, wherein the canopy device 1 is in a third use state.

The child carrier is usually provided with a canopy device, which is connected to an external application part of the canopy device. FIGS. 1 and 2 of the present disclosure show schematic views of a canopy device 1 installed on a frame 2 of a child vehicle according to an embodiment of the present disclosure. However, the child carrier and the external application part of the canopy device of the present disclosure are not limited thereto. The child vehicle and the frame 2 thereof are only exemplary, and the canopy device 1 according to the present disclosure may also be installed on a framework of a child bed, a baby sleeping basket, or the like.

Referring to FIGS. 1 and 2, the canopy device 1 according to an embodiment of the present disclosure includes a first shielding portion 11, a second shielding portion 12, a third shielding portion 13 and a fourth shielding portion 19. The third shielding portion 13 is connected between the first shielding portion 11 and the second shielding portion 12. The canopy device 1 also includes an accommodating portion 18, and the accommodating portion 18 is disposed on an outer surface of the third shielding portion 13 and forms a pocket shape with an opening. The present disclosure is not limited thereto. The accommodating portion 18 may be disposed on an inner surface of the third shielding portion 13, or at any other suitable position. The accommodating portion 18 of the present disclosure may be provided as a pocket which may have various shapes. In the embodiment shown in FIG. 1, the accommodating portion 18 is a substantially quadrangular pocket, and two opposite sides of the accommodating portion 18 are close to the first shielding portion 11 and the second shielding portion 12 respectively, and the other two opposite sides extend across the third shielding portion 13 respectively. In this embodiment, an opening is formed on the side of the accommodating portion 18 close to the second shielding portion 12. In an embodiment, as shown in FIGS. 1 and 3, the opening of the accommodating portion 18 is only near a part of a boundary line between the third shielding portion 13 and the second shielding portion 12. In another embodiment, the opening of the accommodating portion 18 may extend near the entire boundary line between the third shielding portion 13 and the second shielding portion 12. In other embodiments, the opening of the accommodating portion may be provided at any other suitable position and have any other suitable length. As shown in FIGS. 1 and 2, the first shielding portion 11 is disposed behind the child carrier, the second shielding portion 12 is disposed in front of the child carrier relative to the first shielding portion 11, and the fourth shielding portion 19 may shield the first shielding portion 11 and the right front of the child carrier in an unfolded state. As shown in FIG. 4, when in use, the canopy device 1 may be folded to a certain extent, so that the child may be exposed to the outside to the greatest extent, or it may be fully unfolded to completely shield the child under the canopy device 1.

In an embodiment of the present disclosure, as shown in FIG. 3, the opening of the accommodating portion 18 includes a closing element 181, and the closing element 181 is configured to close the opening of the accommodating portion 18. The closing element 181 of the present disclosure may be any suitable closing structure, such as a zipper, an adhesive tape or a button connecting structure. Of course, the present disclosure is not limited thereto. In another embodiment, the opening of the accommodating portion 18 may not be provided with a closing element.

As shown in FIGS. 1, 3 and 5, the fourth shielding portion 19 is connected to an inner side of the opening of the accommodating portion 18. Of course, the present disclosure is not limited thereto. In another embodiment, the fourth shielding portion 19 is connected to the boundary line of the second shielding portion 12 and the third shielding portion 13. In other embodiments, the fourth shielding portion 19 may be connected to any position of the inner and outer surfaces of the third shielding portion 13. The fourth shielding portion 19 may be selectively unfolded or received in the accommodating portion 18. In an embodiment, as shown in FIG. 3, the fourth shielding portion 19 is received in the accommodating portion 18; and as shown in FIG. 5, the fourth shielding portion 19 is unfolded outside.

As shown in FIGS. 1 and 5, in an embodiment of the present disclosure, the fourth shielding portion 19 includes a first fixing element 191, which may fix the fourth shielding portion 19 to the external application part of the canopy device. In this embodiment, the external application part may be a pedal lever 21 in the frame 2 of the child vehicle. In an embodiment of the present disclosure, the first fixing element 191 may be an elastic belt that may be sleeved on the pedal lever 21. Of course, the present disclosure is not limited thereto. The first fixing element 191 may be any component that may fix the fourth shielding portion 19 on the pedal lever 21.

As shown in FIGS. 1 and 5, in an embodiment of the present disclosure, the fourth shielding portion 19 also includes a second fixing element 193 for fixing the fourth shielding portion 19 to a side of the canopy device. In this embodiment, the second fixing element 193 is a part of the button, which may be buckled with another part of the button (the fixing element 127) disposed on a side of the second shielding portion 12, thereby fixing the fourth shielding portion 19 to the side of the canopy device 1. In another embodiment, the second fixing element 193 may be a part of the adhesive tape, which may be mutually bonded with another part of the adhesive tape disposed on the side of the second shielding portion 12, thereby fixing the fourth shielding portion 19 to the side of the canopy device. Of course, the present disclosure is not limited thereto. The second fixing element 193 may be other fixing structure such as a tether, and its corresponding button part, adhesive part, tether part or other fixing structures may also be disposed at both sides of the first shielding portion 11 or the third shielding portion 13.

As shown in FIG. 5, by means of the first fixing element 191 and the second fixing element 193, the fourth shielding portion 19 may be fixed around the frame 2, and may completely wrap and cover the child carrier on the frame 2 together with the first shielding portion 11, the second shielding portion 12 and the third shielding portion 13 of the canopy device 1, thereby completely protecting against the wind and rain, and preventing mosquitoes from approaching the child in the child carrier.

As shown in FIGS. 1 to 4, in an embodiment of the present disclosure, the canopy device 1 also includes a folding element 14. The folding element 14 includes a first folding element 145 and a second folding element 147. The first folding element 145 is disposed on the boundary line between the second shielding portion 12 and the third shielding portion 13, and the second folding element 147 is disposed on a boundary line between the first shielding portion 11 and the third shielding portion 13. The first folding element 145 and the second folding element 147 may cooperate with each other to fold (FIG. 2) and hide (FIG. 4) the third shielding portion 13 from the outside. In an embodiment of the present disclosure, as shown in FIGS. 1 and 3, the first folding element 145 and the second folding element 147 are respectively arranged along the entire length of the boundary lines between the third shielding portion 13 and the second shielding portion 12, and the entire length of the boundary line between the third shielding portion 13 and the first shielding portion 11. In another embodiment, the first folding element 145 and the second folding element 147 may be only arranged at a part of the boundary line between the third shielding portion 13 and the second shielding portion 12, and a part of the boundary line between the third shielding portion 13 and the first shielding portion 11, respectively. In an embodiment of the present disclosure, the folding element 14 may be any suitable closing structure, such as a zipper, an adhesive tape or a button connecting structure. In the embodiment shown, the folding element 14 is a zipper, the first folding element 145 is a side tooth of the zipper, and the second folding element 147 is the other side tooth of the zipper with a zipper head, or vice versa.

As shown in FIGS. 1 and 2, in an embodiment of the present disclosure, the first shielding portion 11 includes a first shielding portion body 111 and a connecting portion 115. The first shielding portion body 111 is connected with the third shielding portion 13, and the connecting portion 115 is configured to fix a side of the first shielding portion body 111 away from the third shielding portion 13 to the external application part of the canopy device 1. In this embodiment, the external application part may be a backrest lever 22 of the frame 2.

As shown in FIGS. 2 and 3, in an embodiment of the present disclosure, the second shielding portion 12 includes a second shielding portion body 121 and an edge portion 125. The second shielding portion body 121 is connected with the third shielding portion 13, and the edge portion 125 is arranged at a side of the second shielding portion body 121 away from the third shielding portion 13. The edge portion 125 may be arranged in a crescent shape, thereby better avoiding direct sunlight to eyes of the child, and also ensuring that a vision of the child is as broad as possible.

As shown in FIGS. 1 to 5, in an embodiment of the present disclosure, central parts of the first shielding portion 11, the second shielding portion 12 and the third shielding portion 13 are sun-shading clothes and/or waterproof clothes, and two side parts of any of the first shielding portion 11, the second shielding portion 12 and the third shielding portion 13 are mesh yarns, so that the canopy device 1 may not only shield the child from the sun and rain, but also provide sufficient air permeability.

As shown in FIGS. 1 to 5, in an embodiment of the present disclosure, the fourth shielding portion 19 is a net. Of course, the present disclosure is not limited thereto. The fourth shielding portion 19 may be other functional fabrics for shielding wind, rain, sunshine, etc.

The above-mentioned canopy device is only an example. The canopy device of the present disclosure may have other suitable configurations. For example, the canopy device includes only the third shielding portion 13 and the fourth shielding portion 19. For another example, the canopy device only includes the first shielding portion 11, the third shielding portion 13 and the fourth shielding portion 19. For yet another example, the canopy device may include five shielding portions, and a fifth shielding portion is further connected with the first shielding portion 11 or the second shielding portion 12. Of course, the canopy device may also include more than five shielding portions. In other words, the canopy device of the present disclosure may have any suitable number of shielding portions. In addition, the accommodating portion 18 of the present disclosure may be provided on any shielding portion other than the fourth shielding portion 19, as long as the accommodating portion may receive the fourth shielding portion 19.

FIGS. 3 to 5 show three use states of the canopy device according to an embodiment of the present disclosure. In order to better understand the technical solution of the present disclosure, three use modes of the canopy device according to an embodiment of the present disclosure will now be explained by taking the embodiments shown in FIGS. 3 to 5 as examples.

FIG. 3 shows the canopy device 1 in a first use state. The user may receive the fourth shielding portion 19 (it is a net in this embodiment, however, the present disclosure is not limited thereto) into the accommodating portion 18 and close the opening of the accommodating portion 18. For example, in the embodiment shown in FIG. 3, the closing element 181 at the opening of the accommodating portion 18 is closed, so that the net is hidden in the accommodating portion 18, and an appearance outline of the canopy device is smooth, simple and beautiful. The first use state of the canopy device 1 may be adopted when the net is not required but in the case of strong sunlight or other light or raining and snowing.

FIG. 4 shows the canopy device 1 in a second use state. The user may move the first folding element 145 to the vicinity of the second folding element 147 (FIG. 2), and then enable the first folding element 145 and the second folding element 147 to cooperate with each other, so as to fold and hide the third shielding portion 13 from the outside. Obviously, at this time, the accommodating portion 18 and its closing element 181 (if any), as well as the net received in the accommodating portion 18, are hidden. In this state, the appearance outline of the canopy device remains smooth, simple and beautiful. The second use state of the canopy device 1 may be adopted to provide a better vision for the child when the net is not required but in the case that the sunlight or other light is not strong or there is no wind and rain.

FIG. 5 shows the canopy device 1 in a third use state. The user may separate the first folding element 145 and the second folding element 147, then push the first folding element 145 away from the second folding element 147, then open the closing member 181, take out the net, sleeve the first fixing element 191 of the net onto the pedal lever 21, and match and fix the second fixing element 193 of the net with the corresponding component at the side of the canopy device, thus forming the canopy device as shown in FIG. 5 in a state that the canopy device completely wraps and covers the internal space of the carrier. When the net needs to be used, the third use state of the canopy device 1 may be adopted to prevent mosquitoes and insects and provide comprehensive protection for the child.

Although relative terms such as "above" and "under" are used herein to describe the relationship of one component relative to another component, such terms are used herein only for the sake of convenience, for example, in the direction shown in the figure, it should be understood that if the referenced device is inversed upside down, a component described as "above" will become a component described as "under". When a structure is described as "above" another structure, it probably means that the structure is integrally formed on another structure, or, the structure is "directly" disposed on another structure, or, the structure is "indirectly" disposed on another structure through an additional structure.

In this specification, the terms "a", "an", "the", "said" and "at least one", are used to express the presence of one or more the element/constitute/or the like. The terms "comprise", "include" and "have" are intended to be inclusive, and mean there may be additional elements/constituents/or the like other than the listed elements/constituents/or the like. The "first", "second" and "third" are used only as marks, and are not numerical restriction to the objects.

Unless otherwise defined, all terms used herein, including technical and scientific terms, have the same meanings as commonly understood by the ordinary skilled in the field to which the present disclosure belongs. It should also be understood that terms should be interpreted as having meanings consistent with their meanings in the context of related fields, and will not be interpreted as idealized or overly formal meanings unless explicitly defined herein.

It should be understood that although the preferred embodiments are shown and described above, the present disclosure is not limited to the specific embodiments described above, and various modifications and variations can be made by those skilled in the art without departing from the spirit and scope of the appended claims. Therefore, it should be noted that various modifications and variations cannot be considered beyond the technical spirit and scope of the present disclosure.

What is claimed is:

1. A canopy device, comprising:
a first shielding portion, a second shielding portion, and a third shielding portion, wherein the third shielding portion is connected between the first shielding portion and the second shielding portion;
an accommodating portion disposed on a surface of the third shielding portion and forming a pocket shape with an opening; and
a fourth shielding portion connected to the third shielding portion and received in the accommodating portion.

2. The canopy device according to claim 1, wherein the accommodating portion comprises a closing element at an opening thereof for closing the opening of the accommodating portion, and the fourth shielding portion is connected to an inner side of the opening of the accommodating portion.

3. The canopy device according to claim 2, wherein the closing element is a zipper, an adhesive tape, or a button connecting structure.

4. The canopy device according to claim 2, wherein the fourth shielding portion comprises a first fixing element capable of fixing the fourth shielding portion to an external application part of the canopy device.

5. The canopy device according to claim 4, wherein the first fixing element is an elastic belt which is sleeved on the external application part.

6. The canopy device according to claim 2, wherein the fourth shielding portion comprises a second fixing element for fixing the fourth shielding portion to a side of the canopy device.

7. The canopy device according to claim 6, wherein the second fixing element is a part of an adhesive tape or a button connecting structure, and is matched and fixed with corresponding parts at both side parts of the canopy device.

8. The canopy device according to claim 1, wherein the canopy device further comprises a folding element comprising a first folding element and a second folding element, the first folding element is disposed on a boundary line between the second shielding portion and the third shielding portion, the second folding element is disposed on a boundary line between the first shielding portion and the third shielding portion, and the first folding element and the second folding element cooperate with each other to fold and hide the third shielding portion from the outside.

9. The canopy device according to claim 8, wherein the folding element is a zipper, an adhesive tape, or a button connecting structure.

10. The canopy device according to claim 8, wherein the first shielding portion comprises a first shielding portion body and a connecting portion, the first shielding portion body is connected with the third shielding portion, and the connecting portion is configured to fix a side of the first shielding portion body away from the third shielding portion to an external application part of the canopy device.

11. The canopy device according to claim 10, wherein the second shielding portion comprises a second shielding portion body and an edge portion, the second shielding portion body is connected with the third shielding portion, and the edge portion is arranged at a side of the second shielding portion body away from the third shielding portion.

12. The canopy device according to claim 8, wherein central parts of the first shielding portion, the second shielding portion, and the third shielding portion are sun-shading clothes or waterproof clothes, and two side parts of each of the first shielding portion, the second shielding portion, and the third shielding portion are mesh yarns.

13. The canopy device according to claim 1, wherein the fourth shielding portion is a net.

14. A child carrier, comprising:
a canopy device according to claim 1; and
an external application part,
wherein the canopy device is connected to the external application part.

15. The child carrier according to claim 14, wherein the child carrier is a child bed, a stroller, or a baby basket.

\* \* \* \* \*